United States Patent [19]
Poehler

[11] Patent Number: 4,660,722
[45] Date of Patent: Apr. 28, 1987

[54] SHEET FILM CASSETTE

[75] Inventor: Hermann Poehler, Ober-Morlen, Fed. Rep. of Germany

[73] Assignee: Map Mikrofilm Apparatebau, Fed. Rep. of Germany

[21] Appl. No.: 572,077

[22] Filed: Jan. 19, 1984

[30] Foreign Application Priority Data

Feb. 24, 1983 [DE] Fed. Rep. of Germany ....... 3306410

[51] Int. Cl.$^4$ ...................... B65D 25/04; B65D 81/00
[52] U.S. Cl. ................................... 206/454; 206/459; 340/825.34; 353/122
[58] Field of Search ............... 206/449, 450, 454–456, 206/459, 526; 271/207; 340/825.34; 353/116, 120, 122; 369/30–32

[56] References Cited

U.S. PATENT DOCUMENTS 3,536,182 10/1970 Rehrig ................................. 206/459
3,844,649 10/1974 Walter et al. ....................... 206/455
3,997,256 12/1976 Wells .................................. 353/116
4,364,472 12/1982 Waldmeier ......................... 206/459

FOREIGN PATENT DOCUMENTS 2036701A 7/1980 United Kingdom ............... 206/449

Primary Examiner—William Price
Assistant Examiner—Jimmy G. Foster
Attorney, Agent, or Firm—Wegner & Bretschneider

[57] ABSTRACT

An electronic data memory is inserted in a recessed surface section on one side of a sheet film cassette. Contact points on the data memory make it possible for the memory to be positively connected, when the sheet film cassette is pushed into a sheet film reader, with the electrical energy supply and the leads for data transfer. The data memory stores cassette-specific data, in particular, an index list. The same data can also be used for selection of cassettes from a filing system.

10 Claims, 1 Drawing Figure

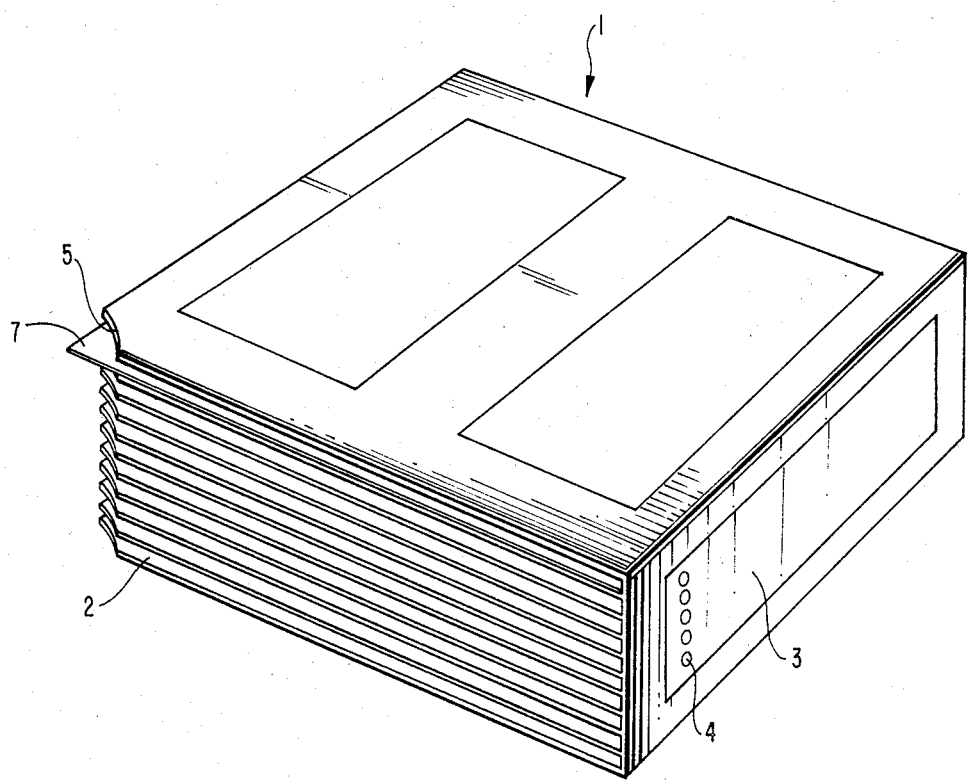

SHEET FILM CASSETTE

BACKGROUND OF THE INVENTION

This invention relates to a sheet film cassette with several compartments, each to respectively receive a sheet film.

In a documentation system which operates with sheet films in cassettes, and in which the individual sheet films in the cassette are automatically found and transported onto the film stage of a sheet film reader, a host of data have to be stored for each cassette. First, an index list is required, from which the individual sheet films can be selected. Furthermore, information has to be stored concerning the state at any given time of the individual sheet films. This is, for example, absolutely necessary for an active film, on which data are gradually recorded until its film field is fully used. To add to such an active sheet film, the respective point must be found again beyond which the film field is still free.

Cassette-specific data have hitherto been stored in the memory of electronic data processing equipment. This requires considerable memory capacity in the electronic data processing equipment, which capacity is often not present or is used for other purposes. It must also be considered that, as in a file cabinet, memory capacity for the data for all expected sheet film cassettes must be provided from the beginning, and is at first not fully used, but frequently is found after a relatively short time to be too small, or else is always unnecessarily large and hence expensive.

To avoid these disadvantages, it is known to store the data associated with the individual sheet film cassettes respectively on a magnetic tape cassette. The memory capacity of the electronic data processing equipment is then not required. However, it is a disadvantage here that a given magnetic tape cassette must be associated with each sheet film cassette and, just as the sheet film cassette, has to be stored and can be inadvertently associated with the wrong sheet film cassette.

Because of its small data capacity, a bar code would not by itself be able to receive the cassette-specific data; hence, a bar code system is not usable in conjunction with a cassette filing system.

SUMMARY OF THE INVENTION

The object of the invention is to develop a sheet film cassette which makes it unnecessary to store cassette-specific data in electronic data processing equipment or in a separate data memory.

This problem is solved by providing, at one side of the sheet film cassette, an electronic data memory. Such a cassette can store all the cassette-specific data in its data memory, so that when the cassette is inserted into the sheet film reader all the data relating to it are automatically available. Memory capacity in the electronic data processing equipment is thus saved. With each added cassette, the memory capacity of the documentation system automatically expands to the correct extent. Any concern with external separate memories associated with each cassette can thus be dispensed with, thanks to the invention.

According to the type of application, it is appropriate to utilize a changeable data memory (EPROM) or an unchangeable data memory (PROM). The unchangeable memory is suitable, for example, for an unchangeable naming of a sheet film cassette. A subsequent alteration of the data, once inserted, is impossible with a PROM. An EPROM permits the stored data to be erased and new data to be stored.

It is particularly advantageous if the data memory is an EEPROM.

These data memories (PROM's, EPROM's, and EEPROM's) are commercially available in the form of microchips which are conventionally used in conjunction with a "writer" which "writes" the data onto the chip. The means to use these chips in conjunction with a sheet film camera or reader, and the associated circuitry, is within the skill of the art and need not be described in detail.

A sheet film reader which is constructed with such a sheet film cassette permits a dialog between the cassette and the equipment. Data for a given, precisely projected sheet film can be input via the keyboard of the sheet film reader and can be stored in the data memory of the sheet film cassette. Automatic finding of the individual sheet films can take place by means of an index list in the data memory of the sheet film cassette.

It is advantageous for the EEPROM to have a memory capacity of at least 2K bytes. Such memories are currently offered for sale and as a general rule are sufficient for storage of the required cassette-specific data. It is of advantage in such a memory that the data can be renewed each time without an integrated current source being required.

Another preferred embodiment of the invention is one in which the data memory is provided on a small plate which has external contact points for electrical energy supply and for data transfer. By means of this embodiment, the data memory is positively connected to the sheet film reader as soon as the sheet film cassette according to the invention is pushed into the sheet film reader.

It is also preferred for the cassette to have a recessed surface section on each of its respective side surfaces, and for the data memory to be inserted into one of these surface sections. Such a cassette can also be used satisfactorily without a data memory. The recessed surface sections then act as finger depressions and facilitate the manipulation of the cassette.

If a sheet film cassette was inadvertently incorrectly filed and consequently an incorrect sheet film cassette was pushed into a sheet film reader, this error will immediately be noticed if the sheet film cassette contains cassette identification data in its data memory. Inadvertent input of new data, not belonging to the sheet film cassette, into the data memory is thereby avoided.

It would contribute to facilitating the use of an automatic sheet film reader if control data for the sheet film reader were stored in the data memory of the sheet film cassette. If, for example, images on the sheet film make necessary a different magnification, instructions to change the magnification ratio of the sheet film reader can be provided in the data memory, so that images respectively appear on the screen in the correct magnification. Likewise, a different image scan can also be taken into account automatically.

If the sheet film cassette is put away in a set of shelves and these are equipped with corresponding contact and evaluation elements, an identification of the desired cassette from among a great number can take place via the memory in the cassette by means of a controlled indicator lamp. This permits, for example, the selection of several cassettes according to given search criteria and offers the convenience that the used cassettes can be stored away randomly.

The invention permits many possibilities of embodiments. One of these is schematically shown in the drawing and is described below.

BRIEF DESCRIPTION OF THE DRAWING

The foregoing object of the invention will be explained by reference to the accompanying drawing in which the single FIGURE is a schematic perspective view of a sheet film cassette according to the invention.

DESCRIPTION OF THE PREFERRED EMBODIMENT

The sheet film cassette 1 is closed on all sides except its front side. Compartments 2, open forwards, are provided in it to receive the individual sheet films. A corner of the cassette is notched, as shown at 5, so that a transport and gripper device (not shown) can engage slightly into each compartment 2 and remove a sheet film 7 from it. The transport and gripper device is that described in co-pending patent application Ser. No. 541,583, filed Oct. 13, 1983 and commonly assigned herewith, now U.S. Pat. No. 544,151, granted Oct. 1, 1985. Co-pending application Ser. No. 451,583 is embodied herein in its entirety by reference. On its right-hand side surface, seen in the drawing, an electronic data memory 3 is inserted onto the sheet film cassette in the form of a small plate in a recessed surface section of the sheet film cassette. This data memory is, for example, an EEPROM with 2K bytes including the required peripheral components. The data memory 3 has contact points 4 on its side facing the open end face of the sheet film cassette, by means of which current supply to the data memory, and data transfer, take place. All cassette-specific data can be stored in the data memory 3, apart from the index list, for example, along with cassette identification data and control data for the sheet film reader.

For filing, the sheet film cassette can rest on the side face provided with the data memory 3 whereby the contact points 4 make contact with corresponding contacts on the shelf or other storage means. This allows for easy location of a particular cassette. The sheet film cassette is closed on all sides except for its front end face, so that four sides are available for writing information to enable manual retrieval.

Finally, it should be noted that the term "sheet film" is chiefly intended to mean a microfiche. The cassette according to the invention is, of course, equally suitable for the storage of other, flat information carriers, such as, for example, aperture cards.

What is claimed is:

1. A sheet film cassette comprising a plurality of compartments for receiving sheets of film; a small plate disposed on one side of the sheet film cassette; an electronic data memory containing information about the sheet films and information for cassette identification disposed on said plate; and external contact points operatively connected to said electronic data memory and extending through said plate for data transfer.

2. A sheet film cassette according to claim 1, wherein the data memory can be altered.

3. A sheet film cassette according to claim 1, wherein the data memory cannot be altered.

4. A sheet film cassette according to claim 1 or 3, wherein the data memory is an PROM.

5. A sheet film cassette according to claim 1 or 2, wherein the data memory is an EPROM.

6. A sheet film cassette according to claim 1 or 2, wherein the data memory is an EEPROM with a memory capacity of at least 2K bytes.

7. A sheet film cassette according to claim 1, 2, or 3 further comprising external contact points for electrical energy supply.

8. A sheet film cassette according to claim 7, wherein a recessed surface section is provided on both respective side surfaces, and the data memory is inserted into one of these surface sections.

9. A sheet film cassette according to claim 1, wherein control data for a sheet film reader are stored in the data memory.

10. A sheet film cassette according to claim 1, wherein information for selection of the sheet film cassette in a filing system is stored in the data memory.

* * * * *